(12) United States Patent
Duparre

(10) Patent No.: US 8,231,814 B2
(45) Date of Patent: Jul. 31, 2012

(54) FABRICATION PROCESS FOR MASTERING IMAGING LENS ARRAYS

(75) Inventor: Jacques Duparre, Jena (DE)

(73) Assignee: Pelican Imaging Corporation, Mountain View, CA (US)

( * ) Notice: Subject to any disclaimer, the term of this patent is extended or adjusted under 35 U.S.C. 154(b) by 0 days.

(21) Appl. No.: 13/050,429

(22) Filed: Mar. 17, 2011

(65) Prior Publication Data

US 2011/0241234 A1    Oct. 6, 2011

Related U.S. Application Data

(60) Provisional application No. 61/314,776, filed on Mar. 17, 2010.

(51) Int. Cl.
    *B29D 11/00*    (2006.01)

(52) U.S. Cl. .............. 264/2.7; 264/2.5; 425/808
(58) Field of Classification Search ............. 264/1.1, 264/2.5, 2.7, 138, 219; 425/808
    See application file for complete search history.

(56) References Cited

U.S. PATENT DOCUMENTS

| 4,460,449 A * | 7/1984 | Montalbano ............... 204/281 |
| 2004/0050104 A1* | 3/2004 | Ghosh et al. ............... 65/36 |

* cited by examiner

*Primary Examiner* — Mathieu D. Vargot
(74) *Attorney, Agent, or Firm* — Kauth, Pomeroy, Peck & Bailey LLP

(57) ABSTRACT

A process and method for fabricating a master lens array for use in the manufacture of duplicate lens arrays is provided. The fabrication methods provided herein are capable of maximizing the quality of the master lens array in an efficient and cost effective manner, thereby reducing the propagation of errors in the lenses formed using the master lens array.

15 Claims, 4 Drawing Sheets

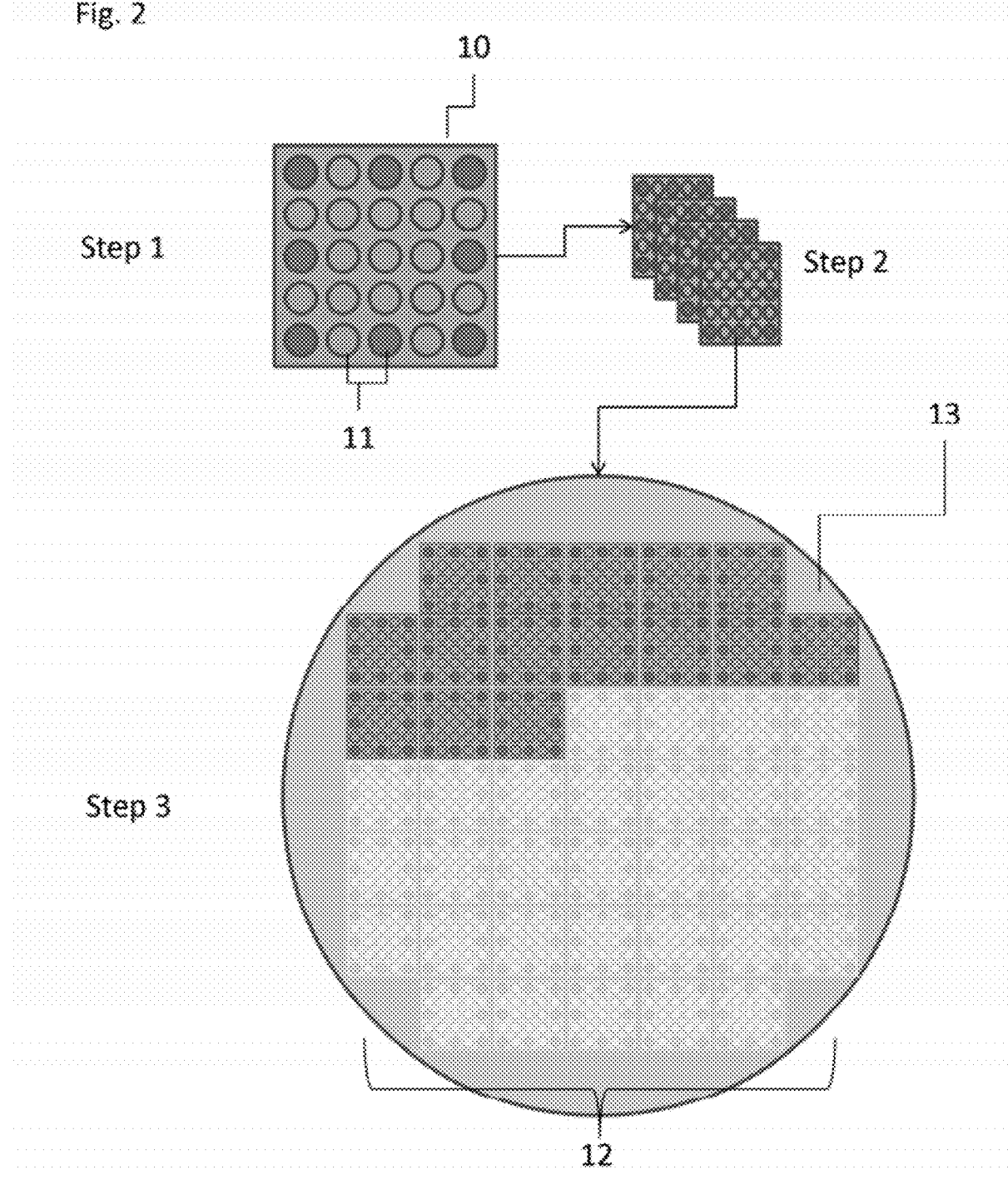

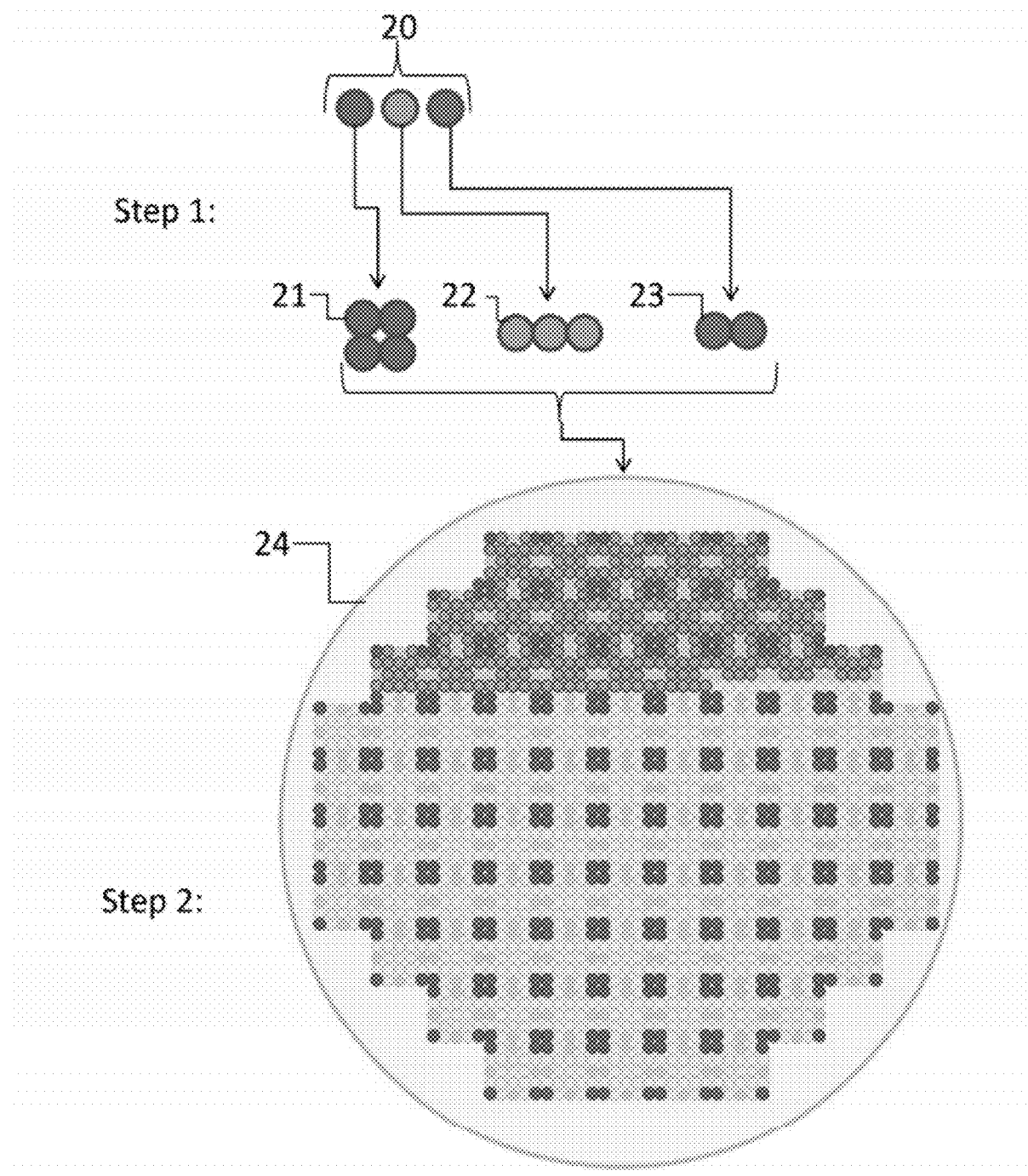

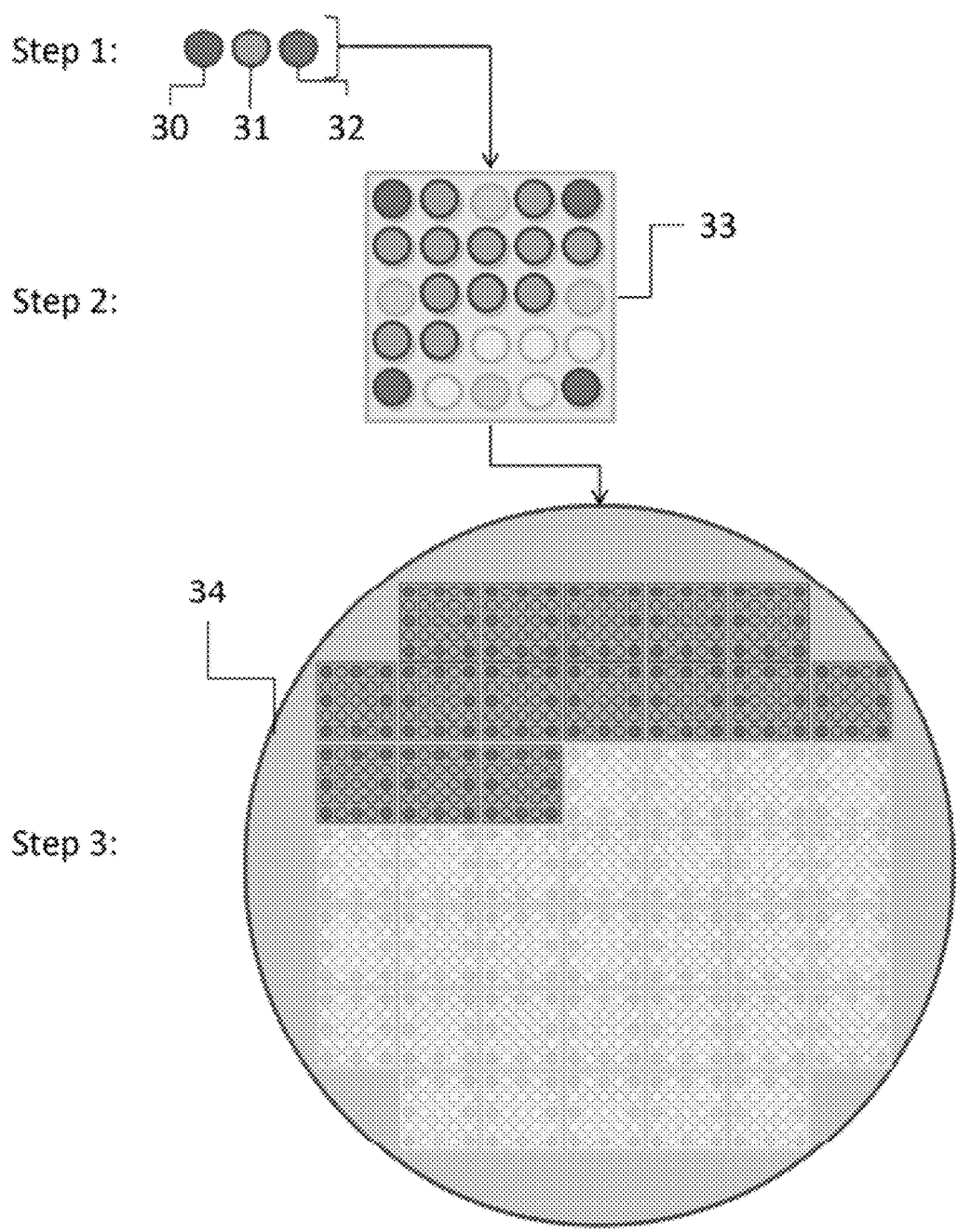

FABRICATION PROCESS FOR MASTERING IMAGING LENS ARRAYS

RELATED APPLICATION

This application claims priority to U.S. Provisional Patent Application 61/314,776 filed Mar. 17, 2010, the disclosure of which is hereby incorporated by reference in its entirety.

FIELD OF THE INVENTION

The present invention relates to a fabrication process for mastering large imaging lens arrays, which cannot be fabricated by lithographic means.

BACKGROUND OF THE INVENTION

The manufacture of very small lenses has undergone enormous development since the 17th century when Robert Hooke and Antonie van Leeuwenhoek both developed techniques to make small glass lenses for use with their microscopes. In these early techniques, Hooke painstakingly melted small filaments of glass and allowed the surface tension in the molten glass to form the smooth spherical surfaces required for lenses. (See, Hooke R, Preface to *Micrographia*, The Royal. Society of London (1665), the disclosure of which is incorporated herein by reference.)

Advances in technology have enabled microlenses to be designed and fabricated to close tolerances by a variety of methods. The optical efficiency of diffracting lenses depends on the shape of the groove structure and, if the ideal shape can be approximated by a series of steps or multilevels, the structures can even be fabricated using technology developed for the integrated circuit industry. This area is known as binary optics. (See, e.g., Veldkamp W B, McHugh T J., *Scientific American*, Vol. 266 No. 5 pp 50-55, (May 1992), the disclosure of which is incorporated herein by reference.) In most cases, multiple copies of these lenses are desired for use in large lens arrays. These lens arrays can be formed by moulding or embossing from a master lens array. The ability to fabricate arrays containing thousands or millions of precisely spaced lenses has led to an increased number of applications. (See, e.g., Borrelli, N F. *Microoptics technology: fabrication and applications of lens arrays and devices*, Marcel Dekker, New York (1999).

Indeed, microlenses in recent imaging chips have attained smaller and smaller sizes. The Canon EOS-1Ds Mark III packs 21.1 million microlenses onto its CMOS imaging chip, one per photosite, each just 6.4 micrometer across. An announced Sony DSLR 24.6 MP image sensor will have even smaller microlenses. However, these microlenses are fill factor enhancing lenses, which are very small (e.g., with a lateral scale of microns) and can be fabricated by standard lithographic means. It is not possible to use such techniques for fabricating imaging lenses (such as, e.g., the objectives of mobile phone cameras), which are several orders of magnitude larger, because the magnitude of lens sag is significantly higher, e.g., on the order of hundreds of microns. Accordingly, the only technique currently available to form these lenses is by diamond turning. Currently, large arrays of these imaging lenses are either fabricated by full wafer diamond turning, or by the so-called step & repeat technology of duplicating identical lenses across a wafer.

As the numbers of individual lens elements required has increased, it has become difficult to ensure proper quality control using these standard techniques. Specifically, during manufacture of the master lens template, even by a state-of-the-art process such as diamond turning, lenses are formed with different shapes, and therefore, inherently different optical properties even when the lenses were intended to be identical. This shape deviation from the ideal lens profile results in wavefront errors and finally in a reduced image resolution. In addition, it is difficult to maintain pitch control (i.e., the relative placement of lenses in the x-y plane) when performing such manufacturing across an entire wafer of lens elements. The result is that it is very difficult to manufacture a master lens array that is close to ideal, i.e., that has properly shaped lenses (no shape deviation), and that are also properly positioned in relation to the other lens elements (good pitch accuracy.

Moreover, while these standard techniques are designed to produce large arrays of identical lenses, in state-of-the-art computational array cameras irregular lens arrays (meaning lenses within one array having different surface profiles) are required, for example, to correct chromatic aberrations of the different channels sensitive to different narrow spectral wavebands. Current manufacturing techniques provide no alternative but to individually diamond turn each of the unique lens elements, which, again, increases the probability that non-ideal master arrays will be formed, i.e., that include one or more shape or pitch deviations.

Accordingly, a need exists for fabrication processes capable of efficiently and accurately achieving highly precise large regular, but mainly irregular lens arrays, which have imaging lenses with such large sags that the very "original." or "initial." master structure, even for the ideal lens, can be done only by diamond turning.

SUMMARY OF THE INVENTION

The current invention is directed to a method of fabricating a master lens array comprising a plurality of individual lenses.

In one embodiment, the method includes fabricating a sub-array of lenses that is formed of a plurality of individual lens elements, wherein the number of individual lens elements in the sub-array is a sub-set of the number of individual lens elements contained in the desired large master lens array, and then duplicating the sub-array on a substrate a number of times sufficient to form the waferscale master lens array.

In another embodiment, the method also includes a quality control step wherein the sub-array is checked for shape deviations of the lenses and pitch accuracy and the fabrication step repeated until a sub-array substantially free from shape deviations and with sufficient pitch accuracy is formed.

In still another embodiment, the sub-array is formed of a plurality of lenses having different surface profiles.

In yet another embodiment, the method includes fabricating a plurality of master lens pins, each master lens pin being of a different lens shape, and then duplicating each of the master lens pins on a substrate a number of times sufficient to form the waferscale master lens array. In such an embodiment, each of the master lens pins may be quality checked for shape deviation and the fabrication step repeated until a set of master lens pins is formed having acceptable shape deviation.

In still yet another embodiment, the method includes fabricating and duplicating a plurality of master lens pins, each master lens pin being of a different lens shape, to form a sub-array of lenses and then duplicating the sub-array on a substrate a number of times sufficient to form the waferscale master lens array. In such an embodiment, both the master lens pins and the sub-array may be quality checked for shape deviations (and pitch accuracy) and the fabrication step repeated until a set of master lens pins and a sub-array are formed that are substantially free of shape deviations (and pitch misalignment).

In any of the above embodiments, the lens elements or lens pins may have a plurality of different lens profiles. In such an embodiment, the lens profiles of the lens elements or lens pins may differ in accordance to at least one of either radius of curvature and aspheric coefficients.

In any of the above embodiments, the lens elements of the sub-array may have a single lens profile.

In any of the above embodiments, the sub-array may be designed to have the same number and placement of lens elements as is required for a desired array camera module.

In any of the above embodiments, the step of duplicating may be performed by a step and repeat tool.

In any of the above embodiment, each of the individual lens elements and/or lens pins of the sub-array may be fabricated by diamond turning.

BRIEF DESCRIPTION OF THE DRAWINGS

These and other features and advantages of the present invention will be better understood by reference to the following detailed description when considered in conjunction with the accompanying drawings, wherein:

FIG. 2 is a schematic of a first exemplary embodiment of a lens array mastering fabrication technique in accordance with the current invention;

FIG. 3 is a schematic of a second exemplary embodiment of a lens array mastering fabrication technique in accordance with the current invention; and FIG. 4 is a schematic of a third exemplary embodiment of a lens array mastering fabrication technique in accordance with the current invention.

DETAILED DESCRIPTION OF THE INVENTION

Figure 1:
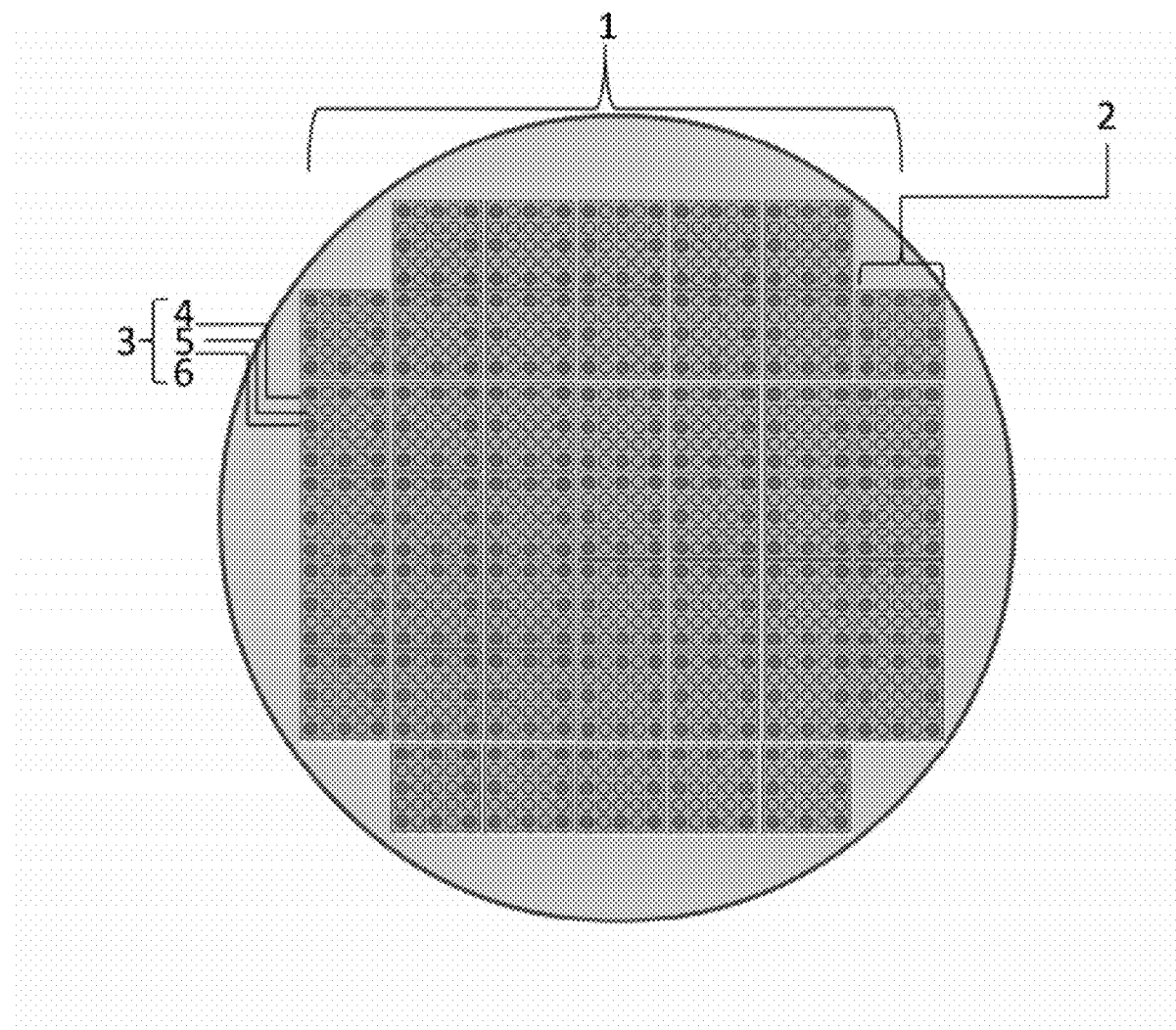
FIG. 1 is a schematic of an exemplary waferscale lens array.

The present invention relates to a process and method for fabricating a master imaging lens array for use in the manufacture of duplicate lens arrays for imaging lenses in which standard lithographic techniques are not usable, e.g., because the magnitude of lens sag is too great for such lithographic techniques. The master lens array is critical because it is the template that is used to fabricate a tool (or in some instances used itself as the tool) for subsequent replications of the final large lens arrays. The final goal of this invention is to make a high quality waferscale master that can be used in the fabrication of final computational array cameras.

In operation, the waferscale master formed in accordance with the current invention would be used to duplicate waferscale lens arrays. These duplicate lens arrays are then stacked with spacers to form a multi-layer structure of lens arrays. This multilayer structure is then singulated or sub-divided into sub-arrays of a desired size via a known technique, such as, dicing, etc. to form the final lens modules. This final lens module may also be combined with an image sensor array to form the final computational camera module. The methods of the instant invention are capable of maximizing the quality of the master lens array in an efficient and cost effective manner, especially when it is required that lenses of different shapes are to be found in the array, thereby reducing the propagation of errors in the waferscale lens array formed using the master lens array.

To understand the process of the current invention it is necessary to first understand the nature of the lens arrays contemplated by the application. As shown in FIG. 1, a waferscale lens array (1) can be defined as any grouping of large numbers of lens elements. These lens elements may be arranged in sub-arrays (2), which are themselves formed of a plurality of individual lens elements (3). The individual lens elements of these master lens arrays may have the same surface profiles, or each lens element may be manufactured having different surface profiles (4 to 6). For example, each of the lenses in the master array may be designed with different focal lengths or to allow for different corrections of chromatic aberrations of the different channels sensitive to different narrow spectral wavebands, such as by altering the radius of curvature and aspheric coefficients.

During a conventional mastering process, each of the individual lens elements of the master lens array is manufactured separately using a fabrication process such as diamond turning of the underlying substrate wafer. As discussed in the background, each time an individual lens is manufactured anew and not duplicated from a master, there is a risk of a shape or pitch deviation being introduced in the master array, either in the shaping of the lens or in the placement of that lens in relation to the other lenses on the array. For arrays of identical lenses, current manufacturing techniques use a step & repeat process, in which a master lens pin is manufactured once by diamond turning and then duplicated many times to form a waferscale array, but traditional methods of manufacturing non-regular arrays of lenses, i.e., arrays of lenses having different surface profiles, rely on fabricating each of the lens elements in the master array individually. Obviously, to form a large array of lenses this process must be repeated thousands if not millions of times to create the full master array, as such there is a high probability of defects being formed in the master array and these defects being duplicated in subsequent arrays made from that master.

The current invention provides methods for fabricating a master lens array that reduce the risk of such error propagation. In particular, the current invention recognizes that to minimize the risk of shape and pitch deviations in the master lens array it is necessary to limit the number of unique lens elements created during the master array fabrication process. Accordingly, the current invention uses novel duplication schemes to minimize the number of times "unique" lens elements must be formed and that also limit the number of position steps required to manufacture a larger master array.

A first embodiment of the invention is shown schematically in FIG. 2. In this embodiment, a sub-array (10) of individual lens elements (11) is formed first and then this sub-array is duplicated across the entire substrate wafer (12) to form the final waferscale lens array (13). More specifically, in a first step each of the lens elements (11) in a sub-array (10), in this case an array of 5×5 individual lens elements, is formed via a conventional manufacturing technique, such as, for example, diamond turning. In a second step this sub-array (10) is quality checked to ensure that each of the individual lens elements has been produced with the correct surface profile and has been positioned properly in relation to the other lens elements. In step 3, once the sub-array has been checked, it is then used as a master to reproduce identical copies of the sub-array across the entire substrate to form the full master array (13). In this embodiment, because the requirement for xy-precision is shifted to that of a Step & Repeat tool, which is specifically designed for that purpose, the likelihood of a positioning error is reduced. In addition, the number of individual positioning steps is reduced over a technique that requires the tool to individually position each lens element.

As discussed above, the lens elements in the sub-array may have identical surface profiles, or, as shown in this embodiment, may each have different surface profiles. In addition, although a 5×5 master sub-array is used as the template in the example provided, it should be understand that any size of sub-array suitable for the specific camera application in question may be used in the method of the current invention. However, because the same manufacturing constraints exist in formation of the sub-array, i.e., that each time a new lens element is formed the likelihood of a defect, either in shaping or positioning, is increased, it is still advantageous to limit the number of elements that must be uniquely formed. In addition, the smaller the array, the easier it is to check each of the lens elements for manufacturing defects.

In a second embodiment, shown schematically in FIG. 3, individual master lens pins are formed. The lens pins can be either single lens elements (20), each having different surface profiles, or small arrays of lens pins (21 to 23) having the same surface profiles. (Step 1) Then, in a second step, these master lens pins are repeatedly used to manufacture the desired lens profile at the right position on the wafer (i.e., in the correct channel of a particular later camera array). Once all the lenses of a first lens pin are reproduced on the entire master array (24) (e.g., for the embodiment shown, 4 times for each sub-array on the wafer), then the pin would be changed and a second lens pin would be used to reproduce all the lenses of the second lens profile, and so on.

The advantage of this method is that all lenses intended to be identical are identical since they come from the same master pin. Moreover, this pin can be quality checked and iterated in the diamond turning manufacturing process until one having perfect optical properties is produced. One disadvantage is that there are many placement steps required. This might create placement (pitch) deviations, particularly as between different lens types since pitch deviation could be introduced each time the master pin is exchanged between the individual step & repeat processes.

The third embodiment of the invention (shown schematically in FIG. 4) combines the two approaches set forth above to form a hybrid technique that takes advantage of quality control aspects of both of the earlier fabrication techniques. Specifically, in a first step of this process each of the different lens profiles (30 to 32) would be fabricated (i.e., by diamond turning) as pins once and independently from another. In a second step, these pins (30 to 32) would be used to form a sub-array (33) as in the exemplary embodiment set forth in FIG. 2. For example, in the schematic provided in FIG. 4, three different lens types exchange pins (30 to 32) are formed once by diamond turning. These pins are then used in a Step & Repeat process to form each of the lenses of that type, but only for a sub-array, e.g., in this case a 5×5 array, not the entire master array as proposed in the technique discussed in relation to FIG. 3. This final sub-array (33) can then be quality checked, and, when judged to be good enough for further processing, is then itself used in a Step & Repeat process to populate the full wafer master (34) as proposed in the exemplary embodiment discussed with reference to FIG. 2.

The advantage of the approaches set forth in FIGS. 2 and 4 is that by several trials of directly diamond turning of the sub-array, or by Step & Repeat of the sub-array with previously diamond turned individual lens pins for the various different profiles, one can repeat the procedure of producing the sub-array until one has the desired and sufficient lens profile and pitch accuracy (or predetermined (sub-pixel) variation of the pitch) before going to the much more time consuming and thus expensive process of populating a full wafer master with the multiple copies of the sub-arrays of lenses in a second Step & Repeat process. Accordingly, it is much more likely that the final lens array will have higher quality optics, and that final lens array can be produced with significant cost savings.

Although the above discussion has focused on a fabrication process that utilizes diamond turning, it should be understood that the fabrication schemes of the current invention may be used with any suitable lens manufacturing technique. In addition, while 5×5 arrays of lens elements have been described, any size sub-array suitable for the particular camera application may be used. In making the sub-arrays, it is desirable, but not essential, that the sub-arrays have the same number and placement of lens elements as will be used in the later camera module. For example, if the later camera module is to be formed of arrays of lens elements having 4×4 or 6×6 geometries, then fabricating sub-arrays of 5×5 lens elements would not be practical. Such a mismatch in lens elements would reduce the improvements in pitch accuracy that result from the application of the current invention. Finally, although the above embodiments have been explained with reference to only three unique lens types, it should be understood that any number of unique lens types may be incorporated into the lens arrays formed by the fabrication process of the current invention.

DOCTRINE OF EQUIVALENTS

Those skilled in the art will appreciate that the foregoing examples and descriptions of various preferred embodiments of the present invention are merely illustrative of the invention as a whole, and that variations in the process of the present invention may be made within the spirit and scope of the invention. For example, it will be clear to one skilled in the art that other quality control steps may be implemented or the steps of the fabrication process may be rearranged in ways that would not affect the improvements provided by the fabrication process of the current invention nor render the fabrication process unsuitable for its intended purpose. Accordingly, the present invention is not limited to the specific embodiments described herein but, rather, is defined by the scope of the appended claims.

What is claimed is:

1. A method of mastering a waferscale imaging lens array comprising:
    fabricating a sub-array of lenses comprised of a plurality of individual, lens elements, wherein the number of individual, lens elements in the sub-array is a sub-set of the number of individual, lens elements contained in the waferscale lens array;
    checking the sub-array for shape deviations and pitch accuracy and repeating the fabricating step until, a final sub-array is formed, said final sub-array being substantially free of shape and pitch deviations; and
    duplicating said final sub-array on a substrate a number of times sufficient to form the master waferscale lens array.

2. The method of claim 1, wherein the lens elements of the sub-array have a plurality of different lens profiles.

3. The method of claim 2, wherein the lens profiles of the lens elements of the sub-array differ in accordance to at least one of either radius of curvature and aspheric coefficents.

4. The method of claim 1, wherein the lens elements of the sub-array have a single lens profile.

5. The method of claim 1, wherein the sub-array has the same number and placement of lens elements as is required for a desired array camera module.

6. The method of claim 1, wherein the step of duplicating is performed by a step and repeat tool.

7. The method of claim 1, wherein each of the individual, lens elements of the sub-array is fabricated by diamond turning.

8. A method of mastering a waferscale imaging lens array comprising:
   fabricating a plurality of master lens pins, each master lens pin being of a different lens profile;
   checking each of said master lens pins for shape deviations and repeating the fabricating step until a set of final master lens pins are formed, said final set of master lens pins being substantially free of shape deviations;
   duplicating each of said master lens pins on a substrate a number of times sufficient to form a sub-array of lenses comprised of a plurality of individual, lens elements, wherein the number of individual, lens elements in the sub-array is a sub-set of the number of individual, lens elements contained in the waferscale lens array;
   checking the sub-array for pitch accuracy and repeating the fabricating step until a final sub-array is formed, said final sub-array being substantially free of pitch deviation; and
   duplicating said final sub-array on a substrate a number of times sufficient to form the master waferscale lens array.

9. The method of claim 8, wherein the lens elements of the sub-array have a plurality of different lens profiles.

10. The method of claim 8, wherein the lens profiles of the lens elements of the sub-array differ in accordance to at least one of either radius of curvature and aspheric coefficents.

11. The method of claim 8, wherein the lens elements of the sub-array have a single lens profile.

12. The method of claim 8, wherein the sub-array has the same number and placement of lens elements as is required for a desired array camera module.

13. The method of claim 8, wherein the step of duplicating the sub-array is performed by a step and repeat tool.

14. The method of claim 8, wherein each of the individual, lens elements of the sub-array is fabricated by diamond turning.

15. The method of claim 8, wherein each of the individual, lens pins is fabricated by diamond turning.

* * * * *